US007438963B2

(12) United States Patent
Koops et al.

(10) Patent No.: US 7,438,963 B2
(45) Date of Patent: *Oct. 21, 2008

(54) METHOD FOR PRODUCING A LASER-PRINTABLE FILM

(75) Inventors: Arne Koops, Breitenfelde (DE); Michael Blümel, Oststeinbek/Havighorst (DE)

(73) Assignee: tesa AG, Hamburg (DE)

( * ) Notice: Subject to any disclaimer, the term of this patent is extended or adjusted under 35 U.S.C. 154(b) by 35 days.

This patent is subject to a terminal disclaimer.

(21) Appl. No.: 10/488,016

(22) PCT Filed: Jul. 10, 2002

(86) PCT No.: PCT/EP02/07711

§ 371 (c)(1), (2), (4) Date: Feb. 27, 2004

(87) PCT Pub. No.: WO03/018700

PCT Pub. Date: Mar. 6, 2003

(65) Prior Publication Data

US 2004/0209086 A1 Oct. 21, 2004

(30) Foreign Application Priority Data

Aug. 31, 2001 (DE) ................................ 101 42 638

(51) Int. Cl.
*B32B 9/00* (2006.01)
*B32B 33/00* (2006.01)
*B32B 37/00* (2006.01)
*B42D 15/00* (2006.01)
*B44C 1/175* (2006.01)

(52) U.S. Cl. .................... 428/40.1; 428/41.6; 428/41.7; 428/42.1; 156/237; 156/239; 156/241; 156/272.8; 156/273.3; 283/81; 250/492.3

(58) Field of Classification Search ................ 428/40.1, 428/41.4, 41.6, 41.7, 41.8, 42.1, 913, 914; 156/237, 239, 241, 250, 272.8, 273.3, 275.5; 283/81, 86, 91, 109, 114; 250/492.3
See application file for complete search history.

(56) References Cited

U.S. PATENT DOCUMENTS 5,843,547 A 12/1998 Külper et al. .............. 428/40.1
6,066,437 A 5/2000 Kösslinger .................. 430/297
6,241,289 B1 6/2001 Külper et al. ................. 283/86
6,309,724 B1 10/2001 Külper et al. .............. 428/40.1
6,874,414 B2 * 4/2005 Kaule ......................... 101/129
7,063,882 B2 * 6/2006 Mossbrook et al. .......... 428/203
2003/0031861 A1 2/2003 Reiter et al. ................ 428/343
2004/0247832 A1 * 12/2004 Koops et al. ................ 428/156

FOREIGN PATENT DOCUMENTS

DE 81 30 861 1/1983
DE 41 41 914 A1 6/1993

(Continued)

*Primary Examiner*—Patricia L Nordmeyer
(74) *Attorney, Agent, or Firm*—Norris McLaughlin & Marcus PA

(57) ABSTRACT

Method for producing a laser-printable film which comprises printing an engraving layer comprising a UV-curable coating onto a support film, applying an electron-beam curable coating on top of the engraving layer, and then curing the film by electron irradiation.

23 Claims, 2 Drawing Sheets

FOREIGN PATENT DOCUMENTS

| | | | |
|---|---|---|---|
| DE | 195 09 505 | C1 | 1/1996 |
| DE | 196 30 478 | A1 | 1/1998 |
| DE | 196 42 040 | C1 | 1/1998 |
| DE | 197 47 000 | C1 | 12/1998 |
| DE | 197 46 998 | A1 | 4/1999 |
| DE | 100 06 377 | A1 | 8/2001 |
| DE | 100 48 665 | A1 | 4/2002 |
| DE | 101 39 653 | A1 | 2/2003 |
| EP | 0 645 747 | A2 | 3/1995 |
| EP | 0 941 663 | A1 | 9/1999 |
| WO | WO 93/12155 | | 6/1993 |

* cited by examiner

METHOD FOR PRODUCING A LASER-PRINTABLE FILM

This is a 371 of PCT/EP02/07711 filed 10 Jul. 2002 (international filing date).

The invention relates to a process for producing a laser-inscribable film.

BACKGROUND OF THE INVENTION

Increasing use is being made of labels produced by sophisticated techniques for the identification marking of parts of vehicles, machines, and electrical and electronic devices, etc., examples of such labels being identification plates, control labels for process operations, or guarantee badges or test badges.

In order to inscribe these plates or labels, use is widely made of powerful and controllable lasers which can "burn" markings, such as inscriptions, codes, and the like. High requirements are placed upon the material to be inscribed. For example, the inscription rate is to be high, the resolution capability is to be high, the application is to be simple, and the material is to have high resistance to mechanical, physical, and chemical effects. Commonly used materials, e.g. printed paper, electrolytically oxidized aluminum, lacquered aluminum, or PVC films, do not all fulfill these requirements.

The applicant is introducing a multilayer label which is self-supporting, and comprises a thin, opaquely pigmented lacquer layer over a thick lacquer layer, and is manufactured from an electron-beam-cured, solvent-free lacquer. A label of this type has been described in DE 81 30 861 U1. The label is inscribed by using a laser to engrave the thinner lacquer layer via layer ablation, thus revealing the lower, thicker lacquer layer. The chemical structure of the film material, and the electron-beam curing, gives the film material a high level of resistance.

Processing by means of a laser (preferably a Nd:YAG laser or a $CO_2$ laser) makes it necessary that the upper lacquer layer serving as contrast layer be relatively thin (less than 15 μm), and that it must be of very constant thickness. This is achieved during the production process by using a precision applicator (multiroll system) to apply the thin lacquer layer. To this end, the thin lacquer layer is first applied to a process film or supportive backing film (polyester film), and a doctor is then used to apply the thick lacquer layer. Both lacquer layers are polymerized in a single operation via irradiation with electrons (80 kGy, 350 kV), thus producing a highly crosslinked polymer. This laser-lacquer film is then equipped with a self-adhesive mass, and is peeled away from the supportive backing film during the finishing process.

During the manufacture of the previously known laser-inscribable film, the application of the first lacquer coating is a costly and sensitive step of the process. For example, the precision applicator limits the working width, the selection of the lacquer colors is restricted, there is little flexibility available in coloring the thin lacquer layer, and an adequate quality of coating can be achieved only with a relatively low coating speed.

Furthermore, in some application sectors there is a desire for label individualization, which is to be in place before the laser-inscription process begins. By way of example, this type of individualization might comprise a customer-specific design. This, combined with a controlled distribution routing for the customer-specific individualized labels prior to inscription would serve to prevent counterfeiting, because it would then be almost impossible to forge inscribed labels.

It is an object of the invention to provide a process which can produce a laser-inscribable film and which can be carried out at lower cost than the previously known process, and which permits greater design freedom with respect to the laser-inscribable film, extending as far as customer-specific individualization.

SUMMARY OF THE INVENTION

This object is achieved by a process for producing a laser-inscribable film, wherein an engraving layer, which comprises a UV-curable lacquer, is applied to a supportive backing film by printing. Over the engraving layer, a base layer is applied, and comprises an electron-beam-curable lacquer. Curing takes place by means of irradiation with electrons.

DETAILED DESCRIPTION

In the terminology selected here, which derives from the production process, the position of the supportive backing film is "underneath". In contrast, the engraving layer is exposed in the finished film, i.e. is "on top". The film produced with the aid of the inventive process can, like the previously known multilayer label, be laser-inscribed, by ablating the engraving layer at the desired locations.

According to the invention, the engraving layer is applied by printing, preferably using a UV flexographic printing process. Printing processes provide a wide variety of possibilities for the design of shapes, colors, and color arrangements. For example, the UV flexographic printing process can also be used to apply the engraving layer to materials in web form, and, despite low price, gives good printing quality. This permits considerably greater working width than the previously known process described at the outset.

The engraving layer is preferably cured by means of UV irradiation prior to the application of the base layer. If the base layer (or an optional intermediate layer, see below) is subsequently cured by means of irradiation with electrons, the result is a firm bond between the UV-cured lacquer and the electron-beam-cured lacquer, with high interlaminate adhesion.

The properties of the laser-inscribable film, e.g. high resistance to mechanical, physical and chemical effects, are good and similar to those of conventional laser films. However, in contrast to the production of the multilayer label described at the outset, there is no need for any complicated coating procedure using a multiroll system. Instead of the UV flexographic printing process, it is also possible to use other commonly used printing techniques in order to apply the engraving layer to the supportive backing film.

In one advantageous embodiment of the invention, the engraving layer is applied by printing over the entire surface. The engraving layer here may be of one color, in which case there is preferably strong color contrast with respect to the color of the base layer or of an intermediate layer (see below). In this case, the design of the laser-inscribable film is similar to that of the conventional multilayer label. The film can be inscribed with the aid of a laser (e.g. a Nd:YAG laser or a $CO_2$ laser), by ablating the engraving layer in certain places; if there is strong color contrast between the engraving layer and the layer situated thereunder, the legibility of the inscription is particularly good.

However, the engraving layer may also be applied by printing in two or more colors over the entire surface, because the printing techniques for applying the engraving layer are versatile. By way of example, there may be two, or more than two, contrasting colors which run longitudinally on the laser-inscribable film, i.e. in that direction in which the engraving layer is applied by printing. Another example is given by different contrasting colors which are applied by printing in the transverse direction of the film, in the form of a registering pattern at a prescribed interval. In this way it is possible to generate, within a label set cut to size from the laser-inscribable film, differently colored labels. In principle, other colored designs are also possible for the engraving layer, and extend as far as individualizing identification markings as desired by the customer, e.g. logos or specific inscriptions provided in the engraving layer. The method of laser-inscription here can be as for a single-color engraving layer, via ablation of the engraving layer. In the case of the conventional multilayer labels, a multicolor design is possible only at great cost.

In another advantageous embodiment of the invention, the engraving layer is applied by printing over part of the surface. One example is given by an individualizing logo which is applied by printing in a prescribed color (preferably with strong color contrast with respect to the base layer or intermediate layer) at prescribed intervals onto the supportive backing film. This is a technically simpler and less costly process than that where the engraving layer is applied by printing over the entire surface, thereby requiring the provision of a lacquer of a different color at the locations between the individual logos.

This version of the process is particularly suitable for an embodiment in which, after the engraving layer has been applied by printing and before the base layer has been applied, an intermediate layer is applied and preferably comprises a pigmented electron-beam-curable lacquer. There is preferably a color contrast between the intermediate layer and the base layer. Prior to inscription of the film, the intermediate layer completely covers the base layer, and an engraving layer applied by printing over part of the surface is visually distinguishable from the intermediate layer. For inscription with the aid of a laser, the intermediate layer is ablated at certain locations, where appropriate together with those parts of the engraving layer situated at the location concerned. The base layer thus becomes visible.

The electron-beam-curable lacquer is preferably cured in a single operation and thus crosslinked with the engraving layer, not only in embodiments in which a base layer alone is present but also in embodiments in which a base layer and an intermediate layer are applied. The energy dose here from the irradiation with electrons is preferably in the range from 50 kGy to 150 kGy, and the energy of the electrons is preferably in the range from 200 keV to 500 keV. A doctor may be used to apply the base layer and/or the optional intermediate layer prior to curing.

In one advantageous embodiment of the invention, the engraving layer comprises at least one anti-counterfeiting feature which permits additional individualization and increases the security, with respect to forgery, of the laser-inscribable film, or of a multilayer label cut to size therefrom. Such anti-counterfeiting features are preferably not directly visible, but preferably encur some major equipment costs for their recognition, and therefore for provision of proof of genuineness. By way of example, the engraving layer may comprise dyes which fluoresce in ultraviolet light and which become visible when illuminated by a UV lamp. Another example is given by thermochromic dyes which change their color on heating.

It is also possible to dope the lacquer of the engraving layer with other detectable substances which can provide proof of genuineness, e.g. with substances such as “Biocode” or “Microtaggent”. The company Biocode markets a system with the trademark “Biocode” which has an agent, marker, and receptor, and which can provide specific proof with biological specimens. “Microtaggent” is a trademark of the company Microtrace Inc. for a multilayer color pigment which permits a customer-specific color code to be discerned only when viewed under a microscope. These anti-counterfeiting features are known per se and are available in various embodiments. They are capable of versatile use for the unambiguous identification and identification marking of products.

The engraving layer may comprise a cationic UV lacquer, which is preferably applied by printing at low thickness, e.g. in the range from 1 to 20 g/m$^2$, and particularly preferably in the range from 3 to 6 g/m$^2$. (1 g/m$^2$ corresponds to a thickness of 1 μm if the density of the material is 1 g/cm$^3$.)

The base layer and/or the optional intermediate layer preferably comprises a pigmented electron-beam-curable polyurethane-acrylate lacquer. The thickness of the base layer may be in the range from 20 to 500 g/m$^2$, preferably in the range from 100 to 160 g/m$^2$. An optional intermediate layer is generally thinner than the base layer.

The supportive backing film may comprise a polyester film whose thickness is preferably in the range from 10 to 200 μm.

In one preferred embodiment of the invention, an adhesive mass, e.g. a pressure-sensitive adhesive with a layer thickness in the range from 5 to 70 μm, preferably from 10 to 30 μm, is applied over the base layer. This adhesive mass may be protectively covered by a protective layer (e.g. a silicone paper).

The laser-inscribable film may be produced in the form of a web by the inventive process. Labels may be cut to size therefrom in the sizes required for the usual applications. The supportive backing film may be peeled away before the production process is complete, preferably in a final step of the process. However, it is also possible for the supportive backing film to remain present until it is removed by the customer, prior to inscribing of the label concerned by means of a laser. If the base layer has been provided with an adhesive mass, the customer can easily apply the label at the location intended for the same.

The invention is further illustrated below, using examples. In the drawings,

BRIEF DESCRIPTION OF THE DRAWINGS

FIG. 1 shows how a laser-inscribable film 1 is produced in a first example.

Figure 1:
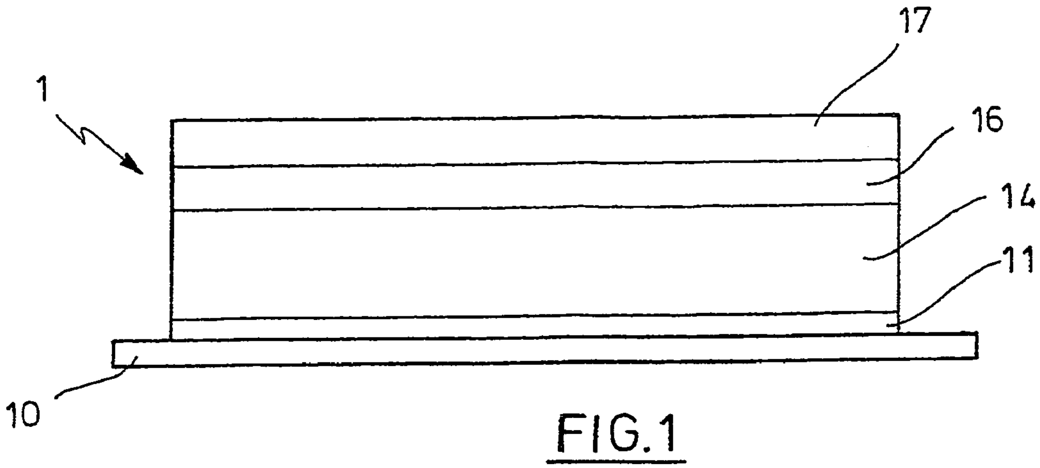
FIG. 1 shows a diagrammatic longitudinal section through a laser-inscribable film produced by a first embodiment of the inventive process and still situated on a supportive backing film.

The backing used comprises a supportive backing film 10, for which the example uses a polyester film with a thickness of 50 μm (Hostaphan RN 50 film, Mitsubishi). A cationic UV lacquer is applied to the supportive backing film 10 by printing over the entire area, with the aid of a UV flexographic printing process. In the example, the amount of lacquer present in the engraving layer 11 thus formed is from 3 to 6

$g/m^2$, i.e. the thickness of the engraving layer is from about 3 to 6 μm. In the example, this lacquer has dark pigmentation. After application by printing, the engraving layer 11 is irradiated with ultraviolet light for curing.

A doctor is then used to apply a base layer 14 composed of an electron-beam-curable-lacquer (in the example, a white-pigmented polyurethane acrylate lacquer) to the cured engraving layer 11. The preferred amount of lacquer is in the range from 100 to 160 $g/m^2$, corresponding to a layer thickness of from about 100 to 160 μm. The base layer 14 is then irradiated with electrons, the acceleration voltage of the electrons being 350 kV in the example, while the energy dose is 80 kGy. The electron-beam-curable lacquer of the base layer 14 is thus crosslinked, and chemical bonds with the engraving layer 11 are simultaneously formed here. The result is a material which has a high mechanical specification and has high chemical resistance, and has layers firmly bonded to one another.

In a further step, a conventional coating process is used to apply an adhesive mass to the base layer 14, thus giving an adhesive layer 16. In the example, the adhesive layer 16 is protectively covered with a silicone paper serving as protective layer 17.

The size of the laser-inscribable film 1 is generally sufficiently large as to permit a number of multilayer labels to be cut to size therefrom. The supportive backing film 10 may be peeled away prior to the cutting-to-size process, or else thereafter, thus providing free access to the engraving layer 11.

Figure 2:
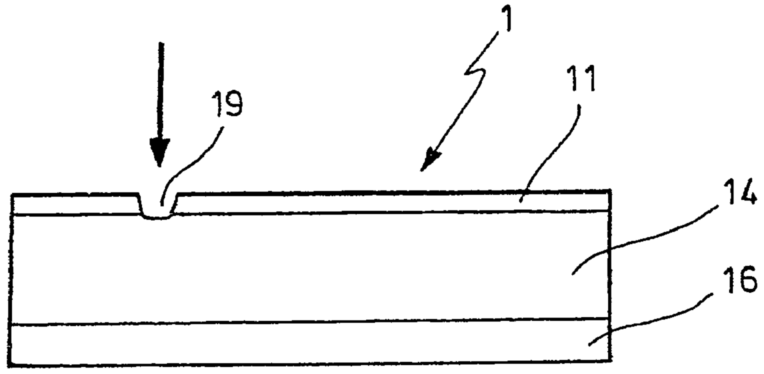
FIG. 2 shows a diagrammatic longitudinal section through a label composed of a film as in FIG. 1 during an inscription procedure carried out with the aid of a laser.

FIG. 2 shows a multilayer label composed of the laser-inscribable film 1, after the supportive backing film 10 was peeled away. In the illustration as in FIG. 2, the orientation of the engraving layer 11 is upward and the protective layer 17 has been removed, because the label has been attached by adhesion to an article not illustrated in FIG. 2. The strength of adhesion of the adhesive layer 16 is preferably such that the film 1 will be severely damaged if it is peeled away from the article.

The film 1 can be inscribed with the aid of a laser beam indicated by an arrow in FIG. 2 and preferably, generated using an Nd:YAG laser or using a $CO_2$ laser. The engraving layer 11 is thus ablated, and thus reveals the base layer 14 situated thereunder. The result is an engraved inscription 19 which has particularly good visibility if there is a high level of color contrast between the engraving layer 11 (in the example, dark) and the base layer 14 (in the example, white).

Figure 3:
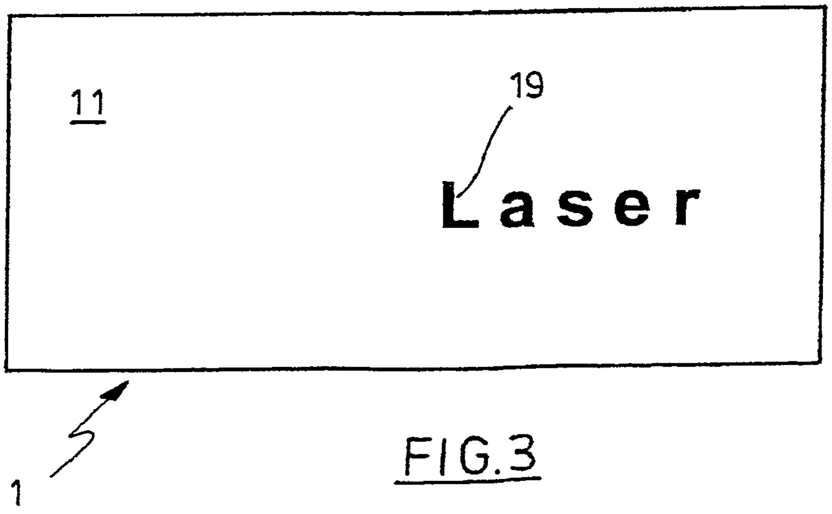
FIG. 3 shows a plan view of the inscribed label as in FIG. 2.

FIG. 3 shows a plan view of the film 1 after the inscription process. In the case of the color selected for the example, therefore, the engraved inscription 19 appears as a white marking on a dark background formed by the non-ablated part of the engraving layer 11.

Figure 4:
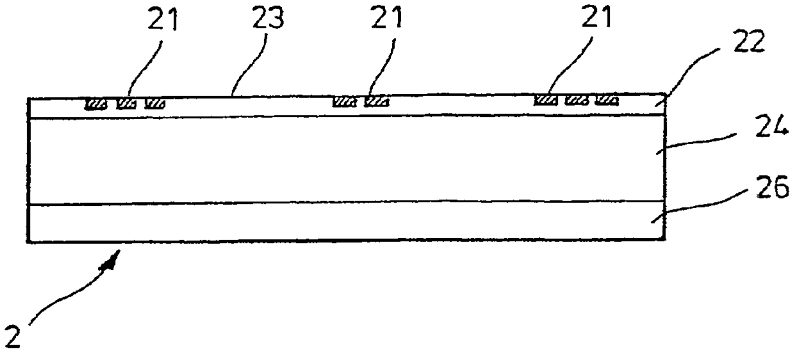
FIG. 4 shows a diagrammatic longitudinal section through a laser-inscribable film produced by a second embodiment of the inventive process, the orientation of the film here being as in FIG. 2.
Figure 5:
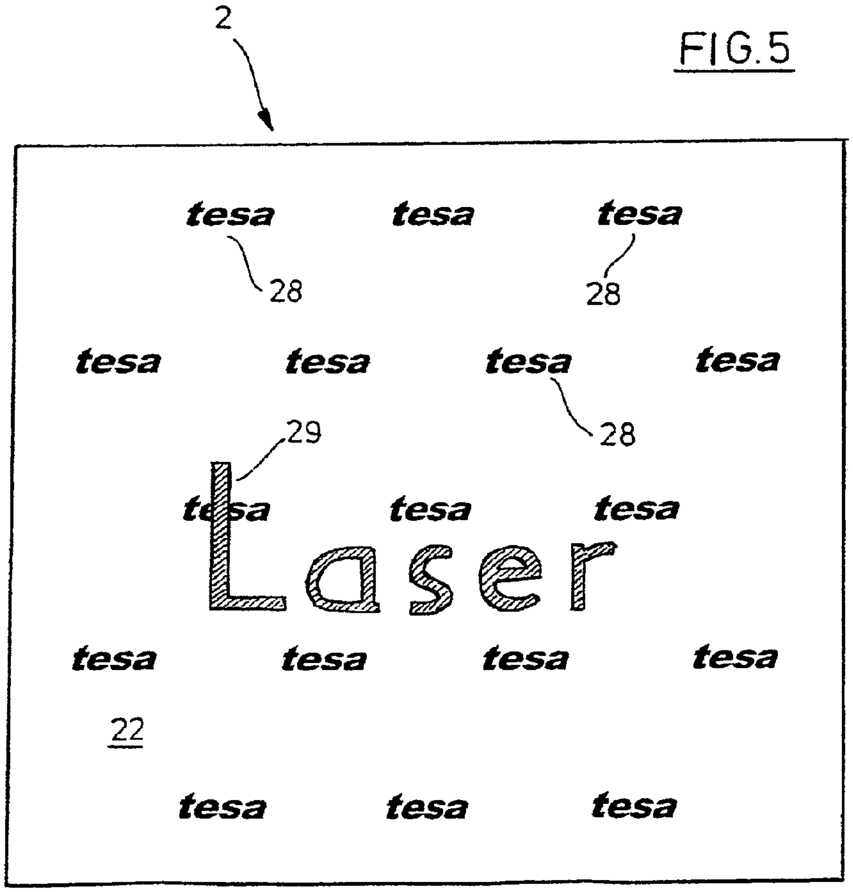
FIG. 5 shows a plan view of an inscribed label composed of a film as in FIG. 4.

A second example of a process for producing a laser-inscribable film is described using FIGS. 4 and 5. Here, the film is indicated by 2. As in the first example, the supportive backing film used comprises a polyester film of thickness 50 μm (Hostaphan RN 50, Mitsubishi), onto which, in succession, a plurality of layers is applied and cured. Finally, the supportive backing film is peeled away. FIG. 4 shows the laser-inscribable film 2 designed as a multilayer label after the removal of the supportive backing film, in an orientation similar to that in FIG. 2. The individual steps of the process are described in more detail below.

First, the supportive backing film is partially printed with a cationic UV-curable lacquer, by way of a UV flexographic printing process. This gives, over part of the surface, an engraving layer 21, which can be seen in the upper region of FIG. 4. In the example, the UV-curable lacquer has dark green pigmentation, and has been applied in the form of a logo 28 repeating at regular intervals, see also FIG. 5. The amount of lacquer here (based on a print applied over the entire surface) is in the range from 3 to 6 $g/m^2$. After application by printing, the engraving layer 21 is irradiated with ultraviolet light for curing.

A doctor is then used to apply an intermediate layer 22, which in the example is composed of a black-pigmented electron-beam-curable polyurethane-acrylate lacquer (amount of lacquer about 13 $g/m^2$). The material of the intermediate layer 22 here surrounds those parts of the engraving layer 21 which protrude from the supportive backing film, thus giving a substantially flat surface 23 ("in-mold-embossed" process). The engraving layer 21 may therefore be regarded as cast into the intermediate layer 21, see FIG. 4.

Prior to electron-beam curing, a doctor is used to apply another layer composed of an electron-beam-curable lacquer, namely the base layer 24. In the example it is again composed of polyurethane-acrylate lacquer, and is white-pigmented. The amount of lacquer is preferably in the range from 100 to 160 $g/m^2$. The base layer 24, the intermediate layer 22 and the engraving layer 21 are then irradiated with electrons from the side of the base layer 24 (in the example, energy dose 80 kGy at 350 kV). The base layer 24 and the intermediate layer 22 are thus cured, and the intermediate layer 22 is thus crosslinked with the engraving layer 21.

As in the first example, an adhesive layer 26 is finally applied (in the example, a pressure-sensitive adhesive with a layer thickness of 20 μm), and is protectively covered by a protective layer (not illustrated in FIG. 4). Once the supportive backing film has been peeled away, and the laser-inscribable film 2 has, where appropriate, been cut to size to give sections of desired size, the result is the condition shown in FIG. 4. FIG. 4 (like FIGS. 1 and 2 is not to scale.

FIG. 5 shows a plan view of the laser-inscribable film 2 (or of a detail therefrom). The design of the engraving layer 21 takes the form of a pattern of logos 28 which appear dark green on the black background formed by the intermediate layer 22. The logos 28 individualize the film 2.

In order to inscribe the film 2, the intermediate layer 22 is ablated at certain locations with the aid of a laser until the white base layer 24 appears thereunder. If a part of a logo 28 is situated at a location exposed to the laser beam, that region of the engraving layer 21 is likewise ablated. The result is an engraved inscription 29, as shown in FIG. 5 (the reproduction of color in which does not correspond to the example).

We claim:

1. A process for producing a laser-inscribable film, comprising the steps of:

(a) applying an engraving layer of a UV-curable lacquer to a supportive backing film which is peelable from said UV-curable lacquer after said UV-curable lacquer is cured, by printing said engraving layer onto said supportive backing film, (b) applying a base layer, which comprises an electron-beam-curable lacquer, over the engraving layer, (c) irradiating the base layer with an electron beam to cure it, and (d) peeling the supportive backing film away from the remainder of the film as a final step of the process.

2. The process as claimed in claim 1, wherein the engraving layer is applied by a UV flexographic printing process.

3. The process as claimed in claim 1, wherein the engraving layer is cured by UV irradiation prior to the application of the base layer.

4. The process as claimed in claim 1, wherein the engraving layer is applied by printing over the entire surface of the backing film.

5. The process as claimed in claim 1, wherein the engraving layer is applied by printing over part of the surface of the backing film.

6. The process as claimed in claim 1, wherein the engraving layer is applied by printing in two or more colors.

7. The process as claimed in claim 1, wherein, after the engraving layer has been applied by printing, and before the base layer has been applied, an intermediate layer is applied, and optionally comprises a pigmented electron-beam-curable lacquer.

8. The process of claim 7, wherein a doctor is used to apply to base layer or the intermediate layer, or is used to apply both of said layers.

9. The process of claim 7, wherein the intermediate layer comprises a pigmented electron-beam-curable polyurethane-acrylate lacquer.

10. The process as claimed in claim 1, wherein the electron-beam-curable lacquer is cured in a single operation and is thus crosslinked with the engraving layer.

11. The process of claim 10, wherein the energy dose from the irradiation with electrons is in the range from 50 kGy to 150 kGy, and the energy of the electrons is in the range from 200 keV to 500 keV.

12. The process as claimed in claim 1, wherein a doctor is used to apply the base layer.

13. The process as claimed in claim 1, wherein the engraving layer comprises at least one anti-counterfeiting feature selected from the group consisting of dyes that fluoresce in UV light, thermochromic dyes, substances comprising a detection system specific to biological specimens, and multilayer color pigments.

14. The process as claimed in claim 1, wherein the engraving layer comprises a cationic UV lacquer.

15. The process as claimed in claim 1, wherein the engraving layer is applied by printing at a thickness in the range from 1 to 20 $g/m^2$.

16. The process of claim 15, wherein said thickness is in the range from 3 to 6 $g/m^2$.

17. The process as claimed in claim 1, wherein the base layer comprises a pigmented electron-beam-curable polyurethane-acrylate lacquer.

18. The process as claimed in claim 1, wherein the base layer is applied at a thickness in the range from 20 to 500 $g/m^2$.

19. The process of claim 18, wherein said thickness of said base layer is in the range from 100 to 160 $g/m^2$.

20. The process as claimed in claim 1, wherein the supportive backing film comprises a polyester film whose thickness is in the range from 10 to 200 μm.

21. The process as claimed in claim 1, wherein, over the base layer, an adhesive mass is applied, and is optionally protectively covered by a protective layer.

22. The process as claimed in claim 1, comprising the further step of cutting the laser-inscribable film to a predetermined size.

23. A multilayer label, produced by the process of claim 1.

* * * * *